(12) United States Patent
Hikmet et al.

(10) Patent No.: US 10,563,843 B2
(45) Date of Patent: Feb. 18, 2020

(54) HIGH BRIGHTNESS LIGHT EMITTING APPARATUS INCLUDING A WAVELENGTH CONVERTING MEMBER WITH IMPROVED THERMAL PROPERTIES

(71) Applicant: SIGNIFY HOLDING B.V., Eindhoven (NL)

(72) Inventors: Rifat Ata Mustafa Hikmet, Eindhoven (NL); Petrus Theodorus Jutte, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/084,839

(22) Filed: Mar. 30, 2016

(65) Prior Publication Data

US 2016/0290604 A1 Oct. 6, 2016

(30) Foreign Application Priority Data

Apr. 1, 2015 (EP) ..................... 15162243

(51) Int. Cl.
*F21V 13/14* (2006.01)
*F21V 29/505* (2015.01)
(Continued)

(52) U.S. Cl.
CPC ............... *F21V 13/14* (2013.01); *F21K 9/64* (2016.08); *F21V 29/505* (2015.01); *F21V 29/70* (2015.01); *G02B 6/4269* (2013.01); *G02B 27/0955* (2013.01); *G03B 21/16* (2013.01); *G03B 21/204* (2013.01); *F21Y 2115/10* (2016.08); *F21Y 2115/15* (2016.08)

(58) Field of Classification Search
CPC ..... F21K 9/64; G02B 6/4269; G02B 27/0955; G03B 21/16; G03B 21/204; F21V 13/14;
(Continued)

(56) References Cited

U.S. PATENT DOCUMENTS

2004/0190304 A1* 9/2004 Sugimoto ............. H01L 33/507
362/555
2005/0179041 A1 8/2005 Harbers et al.
(Continued)

FOREIGN PATENT DOCUMENTS

| JP | 2012185403 A | 9/2012 | |
| JP | WO 2014073136 A1 * | 5/2014 | ........... G02B 26/008 |
| WO | WO2013183556 A1 | 12/2013 | |

OTHER PUBLICATIONS

Kasugai, Source and the image projection apparatus, May 15, 2014, Patent Pub JPWO2014073136A1; Google Patents, https://patents.google.com/patent/JPWO2014073136A1/en?oq=20150226389.*

*Primary Examiner* — Karabi Guharay
*Assistant Examiner* — Michael Chiang

(57) ABSTRACT

According to various embodiments, a light emitting apparatus is disclosed. In one example, the light emitting apparatus comprises a light source arranged to emit light of a first wavelength onto a wavelength converting member. The wavelength converting member comprises a wavelength converting element arranged to convert the light of the first wavelength into light of the second wavelength, a reflective heat conducting element arranged to reflect light of the second wavelength, and a beam shaping heat conducting element arranged to transmit light of the first wavelength and of the second wavelength, wherein the beam shaping heat conducting element is arranged to direct light of the first wavelength and of the second wavelength with an angular distribution within a collection angle of the collecting lens. The wavelength converting element is in direct thermal contact with the beam shaping heat conducting element and in thermal contact with the reflective heat conducting element.

16 Claims, 2 Drawing Sheets

(51) Int. Cl.

| | | |
|---|---|---|
| *F21V 29/70* | (2015.01) | |
| *G02B 27/09* | (2006.01) | |
| *G03B 21/20* | (2006.01) | |
| *G02B 6/42* | (2006.01) | |
| *G03B 21/16* | (2006.01) | |
| *F21K 9/64* | (2016.01) | |
| *F21Y 115/10* | (2016.01) | |
| *F21Y 115/15* | (2016.01) | |

(58) Field of Classification Search
CPC .... F21V 29/505; F21V 29/70; F21Y 2115/10; F21Y 2115/15
See application file for complete search history.

(56) References Cited

U.S. PATENT DOCUMENTS

| | | | | |
|---|---|---|---|---|
| 2005/0270775 | A1* | 12/2005 | Harbers | G02B 27/1046 362/231 |
| 2008/0062672 | A1* | 3/2008 | Peng | C09K 11/02 362/84 |
| 2008/0158873 | A1* | 7/2008 | Bierhuizen | G02B 27/102 362/230 |
| 2010/0172122 | A1* | 7/2010 | Ramer | F21V 14/003 362/84 |
| 2011/0279782 | A1* | 11/2011 | Huang | H04N 9/3111 353/31 |
| 2013/0314893 | A1* | 11/2013 | Paquette | G02F 1/353 362/84 |
| 2014/0346543 | A1 | 11/2014 | Chen et al. | |
| 2015/0015850 | A1 | 1/2015 | Cho et al. | |
| 2015/0049486 | A1* | 2/2015 | Jung | F21V 5/04 362/260 |
| 2015/0226389 | A1* | 8/2015 | Kasugai | G02B 26/008 353/31 |
| 2016/0131336 | A1* | 5/2016 | Kim | G02B 1/02 362/84 |
| 2016/0377785 | A1* | 12/2016 | Chestakov | G02B 19/0066 362/606 |

* cited by examiner

HIGH BRIGHTNESS LIGHT EMITTING APPARATUS INCLUDING A WAVELENGTH CONVERTING MEMBER WITH IMPROVED THERMAL PROPERTIES

CROSS-REFERENCE TO RELATED APPLICATIONS

This patent application claims the priority benefit of European patent application no. 15162243.8, filed on Apr. 1, 2015, the contents of which are herein incorporated by reference.

FIELD OF THE INVENTION

The application relates to a high brightness light emitting apparatus.

BACKGROUND

High brightness sources for emitting light are interesting for various applications including spots, stage-lighting, headlamps and digital light projection. For this purpose, it is possible to make use of so-called light concentrators comprising a wavelength converting member converting light of a first wavelength to light of a second wavelength. Generally, the wavelength converting member converts a substantial portion of the light of a shorter wavelength to light with longer wavelengths. The wavelength converting member may further be shaped as a rod which is illuminated by a light source to produce light with a longer wavelength within the rod. Converted light is transported in the rod by for example total internal reflection and may be extracted from one of the small, or short, sides of the rod, i.e. smaller than the light entrance surface of the rod, which leads to an intensity gain in the converted light emitted from the rod. However, such a light concentrator based light source is rather inefficient and it is challenging to obtain high intensities needed for certain applications.

Alternatively, high intensity light with a desirable spectral distribution may be obtained by a system using a bright light source such as a light emitting diode, LED, or a laser where a high intensity light beam emitted by the light source is sent to a rotating wheel comprising a wavelength converting member such as a phosphor element. The amount of light from the light source that interacts with the wavelength converting member of the rotating wheel determines the spectral distribution of the light emitted. However, having a mechanical moving part reduces the reliability of the system.

SUMMARY

It is an object of the present application to overcome at least some of the above problems, and to provide light emitting apparatus with improved light output.

According to a one aspect of the application, this and other objects are achieved by providing a light emitting apparatus. The light emitting apparatus comprises a high intensity light source arranged to emit light of a first wavelength onto a wavelength converting member, wherein the wavelength converting member is arranged to emit the light of a second wavelength and transmit and/or reflect light of the first wavelength; and a collecting lens arranged to collect light emitted, transmitted, and/or reflected from the wavelength converting member. The wavelength converting member comprises a wavelength converting element arranged to convert the light of the first wavelength into light of the second wavelength, a reflective heat conducting element arranged to reflect light of the second wavelength, and a beam shaping heat conducting element arranged to transmit light of the first and the second wavelengths, wherein the beam shaping heat conducting element is arranged to direct light of the first and the second wavelengths with an angular distribution within a collection angle of the collecting lens. The wavelength converting element is in direct thermal contact with the beam shaping heat conducting element and in thermal contact with the reflective heat conducting element.

The wording high intensity light source should be understood as a light source being arranged to have high luminance. The luminance is preferably more than 0.5 GCd/m$^2$ more preferably more than 1 GCd/m$^2$ and most preferably more than 3 GCd/m$^2$.

The wording beam shaping heat conducting element should be understood as an element which acts upon light such that a property of the light is changed. The beam shaping heat conducting element may for example change the direction of light and/or the propagation path of light. The beam shaping heat conducting element may further influence the spatial extension of the light. The beam shaping heat conducting element may for example comprise a lens.

The wording wavelength converting element should be understood as any element that converts light of a first wavelength to light of a second wavelength. The wavelength conversion may be due to luminescence, fluorescence, and/ or phosphorescence providing generation of a Stokes shift in the wavelength of the converted emitted light relative to the wavelength of the illuminating light.

The wording reflective heat conducting element should be understood as any element that reflects light such that the light is redirected.

It has unexpectedly been found by the inventors that the set-up according to the present application, wherein the wavelength converting member comprises both the reflective heat conducting element and the beam shaping heat conducting element, gives a four times higher light output than with a conventional set-up only using a reflective heat conducting element. Further, the etendue for the light emitting apparatus may be large as compared to conventional light emitting apparatuses since the spot size of the light beam of light of the first wavelength may be set to be relatively small. A well-focused light beam of light of the first wavelength may be used.

Hence, focused light from the high intensity light source is utilized for obtaining high intensity white light by mixing light of the first and second wavelengths. The white light may e.g. be obtained when blue light is partially converted to yellow light by the wavelength converting member. However, the brightness of the light emitting apparatus is limited by what amount of intensity of light the wavelength converting member may handle. By utilizing that the wavelength converting element is in direct thermal contact with the reflective heat conducting element and in thermal contact with the beam shaping heat conducting element, improved thermal conductivity for the wavelength converting member is achieved. Hence, as mentioned above, by utilizing the improved thermal conductivity the spot size of the light emitted by the light emitting apparatus may be decreased. This will also result in an enlarged etendue for the light emitting apparatus. The beam shaping heat conducting element as well as the reflective heat conducting element works as a heat sink for reducing the temperature of the wavelength converting element. Hence, the quantum yield of the wavelength converting element is greatly improved. Moreover, by arranging the beam shaping heat conducting element to direct light of the first and the second wavelengths with an angular distribution within a collection angle of the collecting lens the amount of light being lost within the light emitting apparatus may greatly be reduced.

Accordingly, a light emitting apparatus being arranged to provide an increased brightness or intensity keeping or actually increasing the etendue as compared to conventional light emitting apparatuses is achieved. The increased brightness or intensity is achieved due to the combination of improved thermal properties of the wavelength converting member and the improved collection of light emitted, transmitted or reflected by the wavelength converting member. The increased etendue is achieved due to the improved thermal properties making it possible to reduce the spot size of the high intensity light source hitting the wavelength converting element of the wavelength converting member.

The beam shaping heat conducting element may be formed as a hemi-spherical, a spherical, or a Fresnel lens. Hemispherical lenses are easy to make of materials such as sapphire with high thermal conductivity whereas Fresnel lenses are more difficult to make but can be flat and relatively thin.

The wavelength converting element may comprise a doped portion of a material and the beam shaping heat conducting element comprises an un-doped portion of the material. Simplified manufacturing of the wavelength converting member may be obtained by using the same material for the beam shaping heat conducting element and the wavelength converting element. The doping of the material should be understood to facilitate light conversion in the wavelength converting element such that light of the first wavelength is converted into light of the second wavelength. By doping a desired portion of the material provides wavelength conversion of light. Moreover, by using the same material for the beam shaping heat conducting element and the wavelength converting element improved thermal coupling between the two elements may be achieved.

The wavelength converting element and/or the beam shaping heat conducting element may comprise yttrium aluminum garnet, YAG or lutetium aluminum garnet, LuAG.

The wavelength converting element comprises yttrium aluminum garnet, YAG, or lutetium aluminum garnet, LuAG, doped with Ce.

The wavelength converting element may comprise doped $Al_2O_3$.

The beam shaping heat conducting element may comprise CaF, $Al_2O_3$, diamond, or glass.

The light source may be monochromatic.

The light source may comprise a laser diode and/or a light emitting diode, LED.

The light emitting apparatus may further comprising a mixing member arranged to mix light, originating from the wavelength converting member and being collected by the collecting lens, such that light of the first wavelength and light of the second wavelength are mixed within the mixing member. A light emitting apparatus emitting light having a spatially more uniform spectral distribution may therefore be achieved.

The light emitting apparatus may further comprise an additional lens arranged to focus light, originating from the wavelength converting member and being collected by the collecting lens, into the mixing member after the light has left the collecting lens. A more efficient coupling of light into the mixing chamber may thereby be obtained.

Further features of, and advantages with, will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

The above and other aspects of the present application will now be described in more detail, with reference to the appended drawings showing embodiments of the invention.

As illustrated in the figures, the sizes of layers and regions are exaggerated for illustrative purposes and, thus, are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
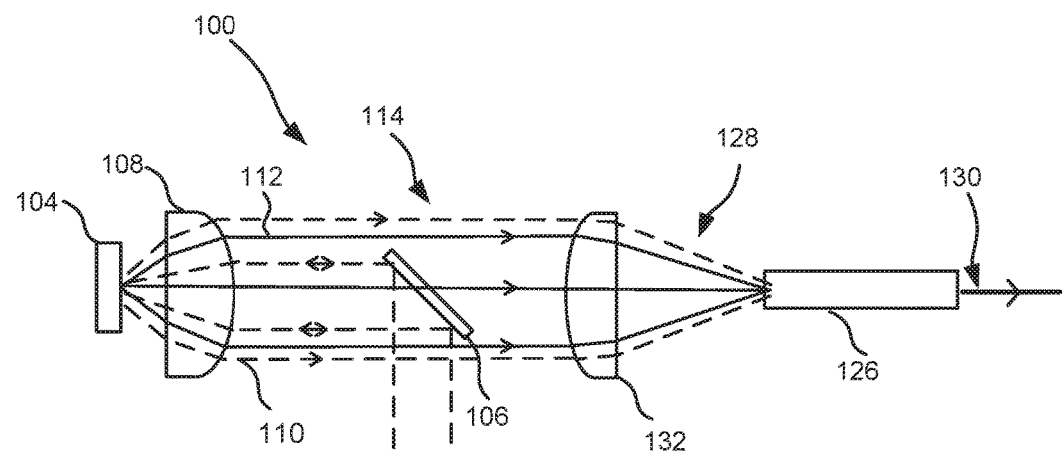
FIGS. 1 and 2 illustrate cross-sectional side views of a respective light emitting apparatus.
Figure 2:
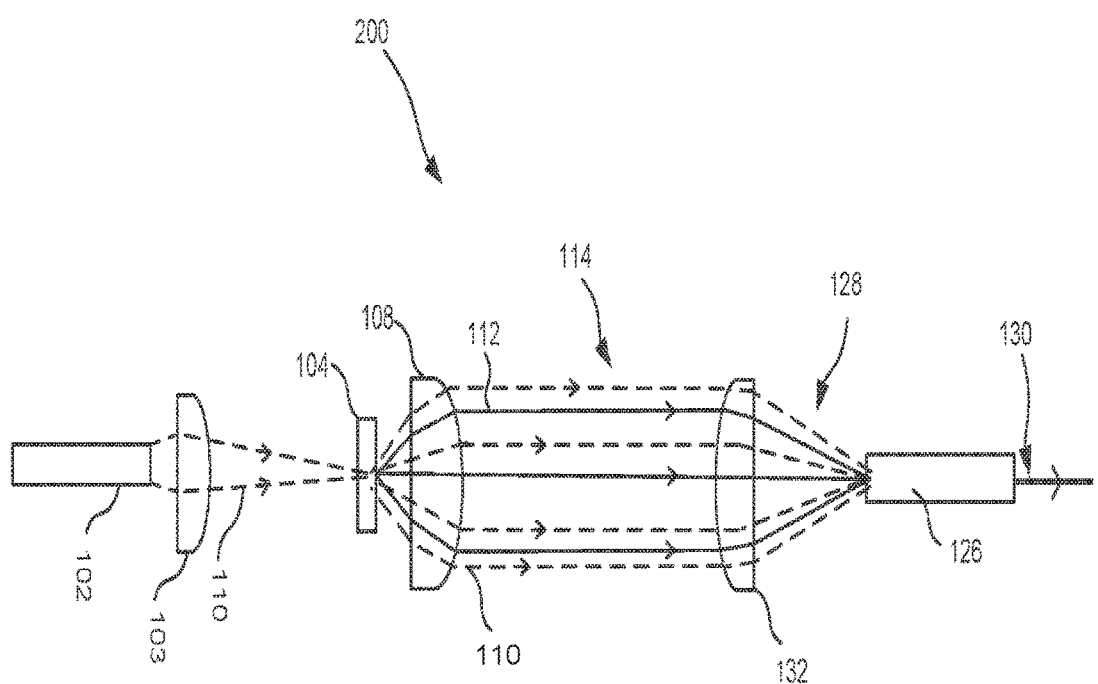

In connection with FIGS. 1 and 2 two alternative embodiments of light emitting apparatuses 100, 200 are disclosed. The function of the in FIGS. 1 and 2 illustrated light emitting apparatuses 100, 200 is similar except for how light of a first wavelength 110 emitted from a respective high intensity light source 102 is directed towards a wavelength converting member 104. In FIG. 1 a reflective arrangement of a light emitting apparatus 100 is illustrated and in FIG. 2 a transmissive arrangement of a light emitting apparatus 200 is illustrated. Common for both light emitting apparatuses 200 is that white light of high brightness is obtained by partially converting the light of the first wavelength 110 into light of a second wavelength 112 using the wavelength converting member 104. Below, first the direction of the light of the first wavelength 110 onto the respective wavelength converting member 104 of respective light emitting apparatus 100, 200 will be discussed separately for each embodiment of the light emitting apparatus 100, 200. Thereafter the function of the light emitting apparatuses 100, 200 will be discussed in common for the different embodiments.

The light emitting apparatus 100 comprises a high intensity light source 102, a wavelength converting member 104, a reflector 106, and a collecting lens 108. The reflector 106 may be a dichroic reflector. However, the skilled person in the art realizes that the reflector may in other embodiments be a mirror or a diffractive grating. The reflector 106 is arranged to reflect light of the first wavelength 110. The reflector 106 when being a dichroic reflector is arranged to transmit light of a second wavelength 112. The high intensity light source 102 is arranged to emit light of the first wavelength 110. An optical element 103 is arranged after the light source 102, i.e. in the path of the light emitted by the light source 102, to collimate the light emitted by the light source 102 and to provide a collimated beam of light of the first wavelength on the reflector 106. The optical element 103 may be a collimating lens. Alternatively, instead of using the collimating lens, a collimating function can be achieved by a curved reflector such as a parabolic reflector. The high intensity light 102 source may then be placed in a focus of the parabolic reflector. Light of the first wavelength 110 emitted from the light source 102 on the reflector 106 is reflected and directed towards the wavelength converting member 104. The collecting lens 108 is arranged to focus light of the first wavelength 110 onto the wavelength converting member 104.

The light emitting apparatus 200, as shown in FIG. 2, comprises a high intensity light source 102, a wavelength converting member 104, and a collecting lens 108. The high intensity light source 102 is arranged to emit light of the first wavelength 110. An optical element 103 is arranged after the light source 102, i.e. in the path of light emitted by the light source 102, to focus the light emitted by the light source 102 and to provide a focused beam of light of the first wavelength on the wavelength converting member 104. The optical element 103 may be a focusing lens. Light of the first wavelength 110 emitted from the light source 102 is hence arranged to be focused onto the wavelength converting member 104.

The description below is directed to the both the embodiment of the light emitting apparatus 100 disclosed in connection with FIG. 1 and the light emitting apparatus 200 disclosed in connection with FIG. 2.

The wavelength converting member 104 is arranged to convert light of the first wavelength 110 into light of a second wavelength 112. The wavelength converting member 104 is further arranged to emit the light of the second wavelength 112. The wavelength converting member 104 is further arranged to reflect and/or transmit light of the first wavelength 110. According to the embodiment as shown in FIG. 1 the wavelength converting member 104 is preferably arranged to reflect light of the first wavelength 110. According to the embodiment shown in FIG. 2 the wavelength converting member 104 is preferably arranged to transmit light of the first wavelength 110.

The collecting lens 108 is arranged to collect light (of various wavelengths, especially light of the first and second wavelengths) emitted, transmitted and/or reflected from the wavelength converting member 104. The collecting lens 108 may be referred to as a collimating lens providing collimation of the light in the focus of the collecting lens 108, i.e. substantially parallel rays 114 of light may leave the collecting lens 108. The collecting lens 108 is here illustrated as a plano-convex lens but the skilled person in the art realizes that other lenses or mirrors and lens or mirror systems may be used.

The light emitting apparatus 100, 200 may comprise a mixing member 126. The mixing member 126 is arranged to mix light 128 entering the mixing member 126. The light 128 entering the mixing member 126 originates from the wavelength converting member 104 and may comprise a spatially varying spectral composition, i.e. light of the first wavelength 110 and light of the second 112 wavelength may be separated in space. The light 128 that enters the mixing member 126 is mixed spatially by for instance multiple reflections and/or diffraction. The light 130 leaving the mixing member 126 may thereby have a spatially more uniform spectral distribution than the light 128 entering the mixing member 126. A light emitting apparatus 100, 200 providing a spatially more uniform output of light may thereby be obtained.

The high intensity light source 102 may be monochromatic, for instance emitting blue light.

The light of the first wavelength 110 may be blue light and the light of the second wavelength 112 may have a longer wavelength than the first wavelength 110, such as yellow light. A combination of the blue and the yellow light may produce white light. By mixing the blue and the yellow light with the mixing member 126 the light emitting apparatus 100 may provide white light 130 with a more uniform spectral distribution.

The mixing member 126 may be an optical fiber. A simple, cost effective and flexible mixing member 126 may thereby be achieved. The light 128 entering the mixing member 126 may further propagate efficiently in the core of the optical fiber by total internal reflection.

The mixing member 126 may alternatively be a transparent rod.

The cross-section of the rod or the optical fiber may be non-circular, for instance having a square, hexagonal or octagonal cross-section in order to improve light mixing.

The light emitting apparatus 100, 200 may further comprise an additional lens 132 arranged to focus light originating from the wavelength converting member 104 and being collected by the additional lens 132 into the mixing member 126. A more efficient coupling of light into the mixing member 126 may thereby be obtained and an increased light output from the light emitting apparatus 100, 200 may be achieved.

Figure 3A:
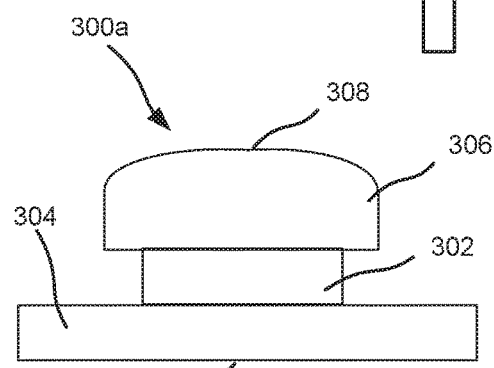
FIGS. 3a.-3c illustrate cross-sectional side views of wavelength converting members of the light emitting apparatus.
Figure 3B:
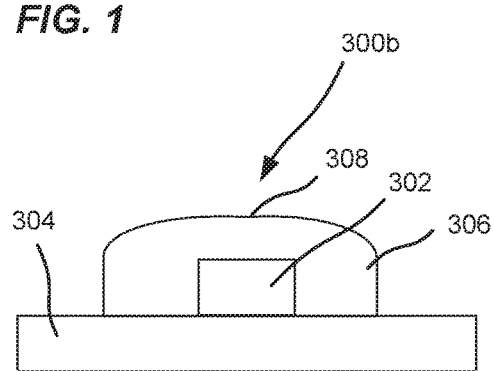
Figure 3C:
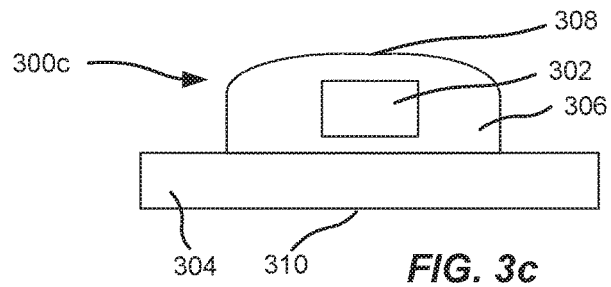

In FIGS. 3a, 3b and 3c cross-sectional side views of embodiments of a wavelength converting member 300a, 300b, 300c suitable to be arranged as the wavelength converting member 104 within any of the light emitting apparatuses 100, 200 are illustrated. The wavelength converting member 300a, 300b, 300c comprises a wavelength converting element 302, a reflective heat conducting element 304 and a beam shaping heat conducting element 306. The wavelength converting element 302 is in direct thermal contact with the reflective heat conducting element 304 and in thermal contact with the beam shaping heat conducting element 306. The wavelength converting element 302 may be chemically bonded to the reflective heat conducting element 304. Hence, no organic glue or other material, which burns when hit by a high intensity light spot, is needed.

The wavelength converting member 300a, 300b, 300c comprises a front surface 308 arranged to face the collecting lens 108 of the light emitting apparatus 100, 200. The beam shaping heat conducting element 306 is arranged at the front surface 308 of the wavelength converting member 300a, 300b, 300c. The wavelength converting member 300a, 300b, 300c comprises a back surface 310, the back surface 310 being opposite the front surface 308. The reflective heat conducting element 304 is arranged at the back surface 310 of the wavelength converting member 300a, 300b, 300c.

The wavelength converting member 300a, 300b, 300c may be a reflective wavelength converting member. With reflective wavelength converting member is meant a wavelength converting member being arranged to be irradiated with light at the front surface 308 thereof. The wavelength converting member 300a, 300b, 300c may be a transmissive wavelength converting member. With transmissive wavelength converting member is meant a wavelength converting member being arranged to be irradiated with light of the first wavelength from the back surface 310 thereof such that light of the first wavelength reaches the wavelength converting element 302.

The wavelength converting element 302 is arranged to convert light of the first wavelength into light of the second wavelength. The wavelength converting element 302 is further arranged to emit the light of the second wavelength.

The wavelength converting element 302 may comprise a phosphor material such as a ceramic phosphor. The ceramic phosphor may be a Ce- or LU-doped YAG ceramic such as Lumiramic with high thermal conductivity. The wavelength converting element 302 may alternatively or also comprise organic fluorescent dyes or quantum dots.

Quantum dots are small crystals of semiconducting material generally having a width or diameter of only a few nanometers. When excited by incident light, a quantum dot emits light of a color determined by the size and material of the crystal. Light of a particular color can therefore be produced by adapting the size of the dots. Most known quantum dots with emission in the visible range are based on cadmium selenide (CdSe) with a shell such as cadmium sulfide (CdS) and zinc sulfide (ZnS). Cadmium free quantum dots such as indium phosphide (InP), and copper indium sulfide ($CuInS_2$) and/or silver indium sulfide ($AgInS_2$) can also be used. Quantum dots show very narrow emission band and thus they show saturated colors. Furthermore the emission color can easily be tuned by adapting the size of the quantum dots. Any type of quantum dot known in the art may be used. However, it may be preferred for reasons of environmental safety and concern to use cadmium-free quantum dots or at least quantum dots having very low cadmium content.

The wavelength converting element 302 may in addition or alternatively comprise an inorganic phosphor. Examples of inorganic phosphor materials include, but are not limited to, cerium (Ce) doped YAG ($Y_3Al_5O_{12}$) or LuAG ($Lu_3Al_5O_{12}$). Ce doped YAG emits yellowish light, whereas Ce doped LuAG emits yellow-greenish light. Examples of other inorganic phosphors materials which emit red light may include, but are not limited to ECAS and BSSN; ECAS being $Ca_{1-x}AlSiN_3:Eu_x$ wherein $0<x\leq1$, preferably $0<x\leq0.2$; and BSSN being $Ba_{2-x-z}M_xSi_5-yAl_yN_{8-y}O_y:Eu_z$ wherein M represents Sr or Ca, $0\leq x\leq 1$, $0\leq y\leq 4$, and $0.0005\leq z\leq 0.05$, and preferably $0\leq x\leq 0.2$.

Hence, the luminescent material of the wavelength converting element 302 may essentially be made of material selected from the group comprising (M<I>1-x-yM<II>xM<III>y)3(M<IV>1-zM<V>z)5O12- where M<I> is selected from the group comprising Y, Lu or mixtures thereof, M<II> is selected from the group comprising Gd, La, Yb or mixtures thereof, M<III> is selected from the group comprising Tb, Pr, Ce, Er, Nd, Eu or mixtures thereof, M<IV> is Al, M<V> is selected from the group comprising Ga, Sc or mixtures thereof, and $0\leq x\leq 1$, $0\leq y\leq 0.1$, $0\leq z\leq 1$, (M<I>1-x-yM<II>x,M<III>y)2O3- where M<I> is selected from the group comprising Y, Lu or mixtures thereof, M<II> is selected from the group comprising Gd, La, Yb or mixtures thereof, M<III> is selected from the group comprising Tb, Pr, Ce, Er, Nd, Eu, Bi, Sb or mixtures thereof, and $0\leq x\leq 1$, $0\leq y\leq 0.1$, (M<I>1-x-yM<II>xM<III>y)S1-zSez- where M<I> is selected from the group comprising Ca, Sr, Mg, Ba or mixtures thereof, M<II> is selected from the group comprising Ce, Eu, Mn, Tb, Sm, Pr, Sb, Sn or mixtures thereof, M<III> is selected from the group comprising K, Na, Li, Rb, Zn or mixtures thereof, and $0\leq x\leq 0.01$, $0\leq y\leq 0.05$, $0\leq z\leq 1$, (M<I>1-x-yM<II>xM<III>y)O— where M<I> is selected from the group comprising Ca, Sr, Mg, Ba or mixtures thereof, M<II> is selected from the group comprising Ce, Eu, Mn, Tb, Sm, Pr or mixtures thereof, M<III> is selected from the group comprising K, Na, Li, Rb, Zn or mixtures thereof, and $0\leq x\leq 0.1$, $0\leq y\leq 0.1$, (M<I>2-xM<II>xM<III>2)O7- where M<I> is selected from the group comprising La, Y, Gd, Lu, Ba, Sr or mixtures thereof, M<II> is selected from the group comprising Eu, Tb, Pr, Ce, Nd, Sm, Tm or mixtures thereof, M<III> is selected from the group comprising Hf, Zr, Ti, Ta, Nb or mixtures thereof, and $0<=x<=1$, (M<I>1-xM<II>xM<III>1-yM<IV>y)O3- where M<I> is selected from the group comprising Ba, Sr, Ca, La, Y, Gd, Lu or mixtures thereof, M<II> is selected from the group comprising Eu, Tb, Pr, Ce, Nd, Sm, Tm or mixtures thereof, M<III> is selected from the group comprising Hf; Zr, Ti, Ta, Nb or mixtures thereof, and M<IV> is selected from the group comprising Al, Ga, Sc, Si or mixtures thereof, and $0\leq x\leq 0.1$, $0\leq y\leq 0.1$, or mixtures thereof.

Particularly suitable luminescent materials of the wavelength converting element 302 are Ce doped Yttrium aluminum garnet (YAG, $Y_3Al_5O_{12}$) and/or Lutetium-Aluminum-Garnet (LuAG).

Thermal conductivity of the wavelength converting element 302 is preferably higher than 2 more preferably higher than 6 and most preferably higher than 20 $W \cdot m^{-1} \cdot K^{-1}$.

The wavelength converting element 302 is preferably of the same size same as the spot of light of the first wavelength. Typical sizes are 200 μm, 400 μm, and/or 600 μm in diameter.

The reflective heat conducting element 304 comprises a reflecting surface. The reflective heat conducting element 304 is arranged to reflect light of the first wavelength and the reflective heat conducting element 304 is arranged to reflect light of the second wavelength. The reflective heat conducting element 304 may comprise a diffraction grating, a mirror or other suitable reflector. Efficient redistributing of light is thereby achieved and the light emission from the light emitting apparatus 100, 200 is greatly increased.

The reflective heat conducting element 304 is further arranged to distribute heat produced in the wavelength converting element 302. The reflective heat conducting element 304 may comprise a material chosen from the group of materials comprising silver; aluminum; boron nitride; microcellular formed polyethylene terephthalate, MCPET; translucent polycrystalline alumina ceramics, PCA; titanium oxide, $TiO_2$; or combinations thereof. The reflective heat conducting element 304 may comprise a specular- or diffuse-reflecting material such as aluminum or silver. The reflecting member may also comprise boron nitride or, aluminum oxide providing refection and improved thermal conductivity providing improved thermal management. Thermal conductivity of the reflective heat conducting element 304 is preferably higher than 2 $W \cdot m^{-1} \cdot K^{-1}$ more preferably higher than 6 $W \cdot m^{-1} \cdot K^{-1}$ and most preferably higher than 20 $W \cdot m^{-1} \cdot K^{-1}$. The wavelength converting element 302 is in thermal contact with the reflective heat conducting element 304.

For some embodiments the wavelength converting element 302 is in direct thermal contact with the reflective heat conducting element 304. This is illustrated in the embodiment of FIGS. 3a and 3b. Here the wavelength converting element 302 is preferably chemically bonded to the reflective heat conducting element 304. Hence, no organic glue or other material, which may burn when hit by a high intensity light spot, is needed. For some embodiments the wavelength converting element 302 is in indirect thermal contact with the reflective heat conducting element 304. The indirect thermal contact is made via the beam shaping heat conducting element 306, wherein the wavelength converting element 302 is embedded within the beam shaping heat conducting element 306. This is illustrated in the embodiment of FIG. 3c. Efficient redistributing and emission of heat is thereby achieved and the light emission from the light emitting apparatus 100, 200 is increased. This will reduce the heat load on the wavelength converting element 302. Quantum efficiency of the wavelength converting element 302 is thus increased.

The beam shaping heat conducting element 306 is arranged to transmit light of the first and the second wavelengths. Further, the beam shaping heat conducting element 306 is arranged to direct light of the first and the second wavelengths with an angular distribution within a collection angle of the collecting lens 108. Hence, the beam shaping heat conducting element 306 increase light out coupling efficiency of the light emitting apparatus 100, 200 to a large extent.

In the embodiment of the wavelength converting member 300a illustrated in FIG. 3a the beam shaping heat conducting element 306 is placed on top of the wavelength converting element 302. In the embodiment of the wavelength converting member 300b illustrated in FIG. 3b the beam shaping heat conducting element 306 is arranged to cover the wavelength converting element 302 except on a bottom side of the wavelength converting element. Hence, the wavelength converting element 302 is surrounded by the beam shaping heat conducting element 306 from all sides except the bottom side where instead the wavelength converting element 302 is facing the reflective heat conducting element 304. In the embodiment of the wavelength converting member 300c illustrated in FIG. 3c the beam shaping heat conducting element 306 is arranged to surround the wavelength converting element 302 from all sides. Hence, the reflective heat conducting element 304 may be in direct thermal contact with the beam shaping heat conducting element 306. This will enhance the heat conductivity away from the wavelength converting element 302.

In the case of a reflective light emitting apparatus 100 the beam shaping heat conducting element 306 also has the function of decreasing the spot size of the light of the first wavelength irradiated on the wavelength converting element 302.

The beam shaping heat conducting element 306 comprises material with high heat conductivity. The beam shaping heat conducting element 306 is arranged to distribute heat produced in the wavelength converting element 302. The wavelength converting element 302 is in direct thermal contact with the beam shaping heat conducting element 306. Efficient redistributing and emission of heat is thereby achieved and the light emission from the light emitting apparatus 100, 200 is increased. This will reduces the heat load on the wavelength converting element 302. Quantum efficiency of the wavelength converting element 302 is thus increased.

The wavelength converting element 302 may be chemically bonded to the beam shaping heat conducting element 306. Hence, no organic glue or other material which burns in a high intensity light spot is needed. Alternatively, the wavelength converting element 302 may be embedded in the beam shaping heat conducting element 306. This is illustrated in FIGS. 3b and 3c. By embedding the wavelength converting element 302 in the beam shaping heat conducting element 306 the heat conductivity away from the wavelength converting element 302 may be enhanced. Further this also enables side cooling of the wavelength converting element 302.

Thermal conductivity of the beam shaping heat conducting element 306 is preferably higher than 2 more preferably higher than 6 and most preferably higher than 20 $W \cdot m^{-1} \cdot K^{-1}$.

The beam shaping heat conducting element 306 may be made of ceramic material, CaF, $Al_2O_3$, diamond and/or glass. As motioned above the wavelength converting element 302 may comprise a doped portion of a ceramic material, e.g. yttrium aluminum garnet, YAG or lutetium aluminum garnet, LuAG. If so, the beam shaping heat conducting element 306 is preferably YAG or LuAG, respectively. An advantage using YAG or LuAG is that complex shapes of the beam shaping heat conducting element 306 may be made. Also CaF may also be shaped into complex shapes.

The person skilled in the art realizes that the present invention by no means is limited to the preferred embodiments described above. On the contrary, many modifications and variations are possible within the scope of the appended claims.

The reflective heat conducting element may be in direct thermal contact with the beam shaping heat conducting element. This will even further enhance the thermal properties of the wavelength converting member. Hence, the thermal conductivity within the wavelength converting member may be enhanced.

In all embodiments, the heat conducting beam shaping element 306 is arranged on top of the wavelength converting element 302. This improves the heat removal from the wavelength converting element 302. Moreover, it improves the collection light emitted, transmitted and/or reflected from the wavelength converting member 104. Thus, the system efficiency improves to a large extent. Such a beam shaping element also has the function of decreasing the spot size. The heat conducting beam shaping element is made of a material with high heat conductivity and is connected to the reflective heat conducting element acting as a heat sink for reducing the heat load on the wavelength converting element.

In the embodiment of the reflective light emitting apparatus the heat conducting beam shaping element may also collect the laser light reducing the spot size on the wavelength converting element. In the transmissive embodiment of the light emitting apparatus, as shown in FIG. 2, the high intensity light, e.g. laser light, enters the wavelength converting element via the reflective heat conducting element from below.

For example, the beam shaping heat conducting element 306 may take different forms, e.g. the form of a hemispherical, a spherical, a free form, or a Fresnel lens.

The wavelength converting element 302 and the beam shaping heat conducting element 306 may be sintered into a single element.

The reflective heat conducting element 304 and the beam shaping heat conducting element 306 may be made of a similar material.

The lighting apparatus according to embodiments of the invention can, for example, advantageously be applied in a digital projector, a spot light, a stage light, a stadium light or an automotive head light.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A light emitting apparatus comprising:
a high intensity light source arranged to emit light of a first wavelength onto a wavelength converting member, wherein the wavelength converting member is arranged to emit light of a second wavelength and transmit and/or reflect light of the first wavelength; and
a collecting lens arranged to collect light emitted, transmitted, and/or reflected from the wavelength converting member;
wherein the wavelength converting member comprises:
a wavelength converting element arranged to convert the light of the first wavelength into light of the second wavelength,
a reflective heat conducting element arranged to reflect the light of the second wavelength, and
a beam shaping heat conducting element arranged to transmit light of the first wavelength and of the second wavelength, wherein the beam shaping heat conducting element is arranged to direct light of the first wavelength and of the second wavelength with an angular distribution within a collection angle of the collecting lens;
wherein the light of the first wavelength from the high intensity light source enters the wavelength converting element through the reflective heat conducting element;
wherein the wavelength converting element is partially embedded within and in direct thermal contact with the beam shaping heat conducting element and in thermal contact with the reflective heat conducting element, and
wherein the reflective heat conducting element is in direct thermal contact with the beam shaping heat conducting element such that the beam shaping heat conducting element is in surface contact with both the wavelength converting element and the reflective heat conducting element.

2. The light emitting apparatus according to claim 1, wherein the beam shaping heat conducting element is formed as a hemi-spherical, a spherical, a free form, or a Fresnel lens.

3. The light emitting apparatus according to claim 1, wherein the wavelength converting element comprises a doped portion of a material and the beam shaping heat conducting element comprises an un-doped portion of the material.

4. The light emitting apparatus according to claim 1, wherein at least one of the wavelength converting element and the beam shaping heat conducting element comprises yttrium aluminum garnet, YAG or lutetium aluminum garnet, LuAG.

5. The light emitting apparatus according to claim 1, wherein the wavelength convening element comprises yttrium aluminum garnet, YAG, or lutetium aluminum garnet, LuAG, doped with Ce.

6. The light emitting apparatus according to claim 1, wherein the wavelength converting element comprises doped $Al_2O_3$.

7. The light emitting apparatus according to claim 1, wherein the beam shaping heat conducting element comprises YAG, CaF, $Al_2O_3$, diamond, or glass.

8. The light emitting apparatus according to claim 1, wherein the light source is mono chromatic.

9. The light emitting apparatus according to claim 1, wherein the high intensity light source comprises at least one of a laser diode and a light emitting diode, LED.

10. The light emitting apparatus according to claim 1, further comprising a mixing member arranged to mix light, originating from the wavelength converting member and being collected by the collecting lens, such that light of the first wavelength and light of the second wavelength are mixed within the mixing member.

11. The light emitting apparatus according to claim 10, further comprising an additional lens arranged to focus light, originating from the wavelength converting member and being collected by the collecting lens, into the mixing member after the light has left the collecting lens.

12. A digital projector comprising a light emitting apparatus according to claim 1.

13. A light emitting apparatus comprising:
a high intensity light source arranged to emit light of a first wavelength onto a wavelength converting member, wherein the wavelength converting member is arranged to emit light of a second wavelength and transmit and/or reflect light of the first wavelength; and
a collecting lens arranged to collect light emitted, transmitted, and/or reflected from the wavelength converting member;
wherein the wavelength converting member comprises:
a wavelength converting element arranged to convert the light of the first wavelength into light of the second wavelength,
a reflective heat conducting element arranged to reflect light of the second wavelength, and
a beam shaping heat conducting element arranged to transmit light of the first wavelength and of the second wavelength, wherein the beam shaping heat conducting element is arranged to direct light of the first wavelength and of the second wavelength with an angular distribution within a collection angle of the collecting lens;
wherein the light of the first wavelength from the high intensity light source enters the wavelength converting element through the reflective heat conducting element; and
wherein the wavelength converting element is at least partially embedded within and in direct thermal contact with the beam shaping heat conducting element and in thermal contact with the reflective heat conducting element.

14. The light emitting apparatus of claim 13, wherein the wavelength converting element is completely embedded within the beam shaping heat conducting element and in indirect thermal contact with the reflective heat conducting element through the beam shaping heat conducting element.

15. The light emitting apparatus of claim 13, wherein the reflective heat conducting element is in direct thermal contact with the beam shaping heat conducting element such that the beam shaping heat conducting element is in surface contact with the reflective heat conducting element.

16. The light emitting apparatus of claim 13, wherein the wavelength converting element is in direct thermal contact with the reflective beat conducting element such that the wavelength converting element is in surface contact with the reflective heat conducting element.

* * * * *